May 21, 1929.  A. A. WARNER  1,714,064
TOASTER
Original Filed Dec. 8, 1927  2 Sheets-Sheet 1

Inventor
Alonzo A. Warner
By
His Attorney

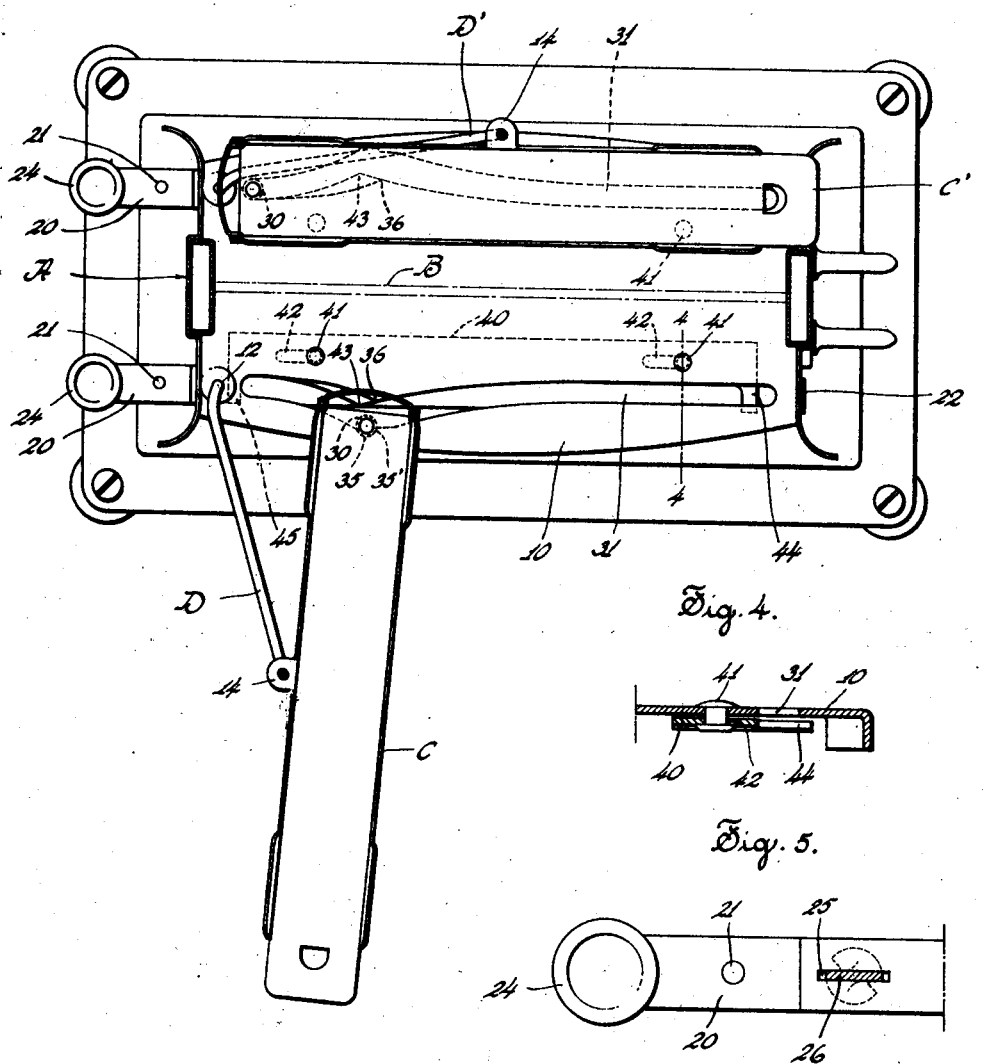

Patented May 21, 1929.

1,714,064

UNITED STATES PATENT OFFICE.

ALONZO A. WARNER, OF NEW BRITAIN, CONNECTICUT, ASSIGNOR TO LANDERS, FRARY & CLARK, OF NEW BRITAIN, CONNECTICUT, A CORPORATION OF CONNECTICUT.

TOASTER.

Application filed December 8, 1927, Serial No. 238,517. Renewed July 31, 1928.

This invention relates to toasters of the type having a toast holder adapted to be moved away from and towards the heating element and to be reversed while so being moved in order to bring first one and then the other side of the slice to be toasted in operative relation to the heating element. A toaster of this type is shown in the A. A. Warner Patent No. 1,404,916 issued January 31, 1922 to Landers, Frary & Clark as my assignor.

The aim of the present invention is to provide a toaster of this kind with improved, simple and effective means whereby the toast holder may be easily and conveniently operated.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawings, wherein I have shown for illustrative purposes, one of the various embodiments which the present invention may take:

Fig. 2 is a horizontal sectional view taken substantially on line 2—2 of Fig. 1;

Fig. 4 is a sectional view taken on line 4—4 of Fig. 2; and

Fig. 5 is a detail view of the operating mechanism, this view being taken substantially on line 5—5 of Fig. 1.

Figure 1:
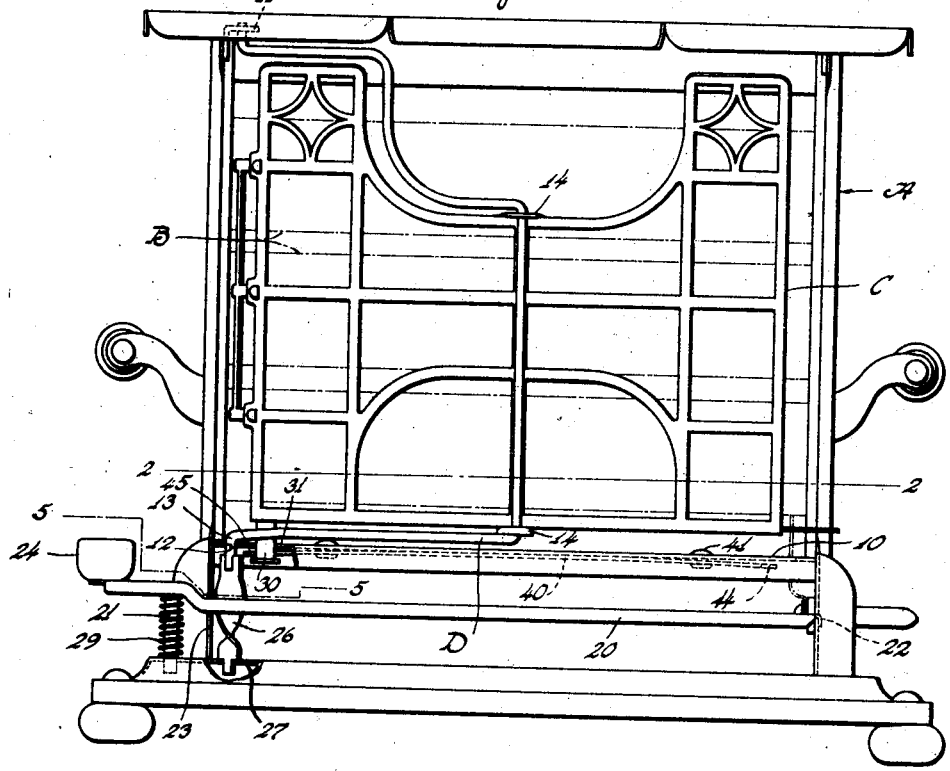
Figure 1 is a front elevational view of the toaster with portions broken away for purpose of clearness.

Referring to the drawings in detail, the toaster is illustrated as having a frame A, a heating unit B, toast holders C and C' on opposite sides of the heating unit, and carriers D and D' for the respective toast holders. These elements and parts are generally similar in construction and arrangement with corresponding parts disclosed in my said Patent No. 1,404,916. The heating element is diagrammatically illustrated by dotted lines, as it may be of any suitable type. The frame has a supporting or guide plate 10. Each of the carriers is mounted for pivotal movement about a vertical axis adjacent one side or end of the heating element. More specifically, the carrier D has its upper end pivoted in an ear 11 and has, at its lower end, a depending pivot portion 13 journalled in a perforation 12 in the plant 10. The holders C and C' are respectively pivoted adjacent their central portions to the carriers D and D' by means of ears 14. The holders C and C' are similarly mounted and operated, and, therefore, a description of one applies to the other.

In accordance with the present invention, each of the carriers is swung about its axis, to move the holder carried thereby from and towards the heating unit, by an actuating member preferably operable from one end of the frame. This actuating member, in the present illustrative disclosure of the invention, includes a lever 20 having a pin 21 riveted to the lever and slidably extending into the base of the frame. The lever 20, which is preferably formed of a strip of sheet metal, is pivoted as at 22 to one of the side uprights of the frame; extends longitudinally between the base of the frame and the guide plate 10, and projects through a slot 23 in the other side upright. This member 20 may carry on its free end a button or similar member 24. The lever 20 has a slot 25 which receives a spiral member 26. This spiral member (which is preferably formed of a strip of metal turned about its longitudinal axis through an angle of 180°) has its upper end fixed to the depending portion 13 of the carrier and has its lower end journalled in an opening 27 in the base. Coiled about the pin 21 and positioned between the base and the lever 20 is a spring 29 which serves the purpose of urging the actuating member upwardly and through the spiral member 26 moving the carrier in a direction to bring the holder thereon towards the heating element. It will be observed that with this arrangement, when the actuating member is depressed by pushing down on the button 24, the carrier swings away from the heating element and when pressure on the button is relieved, the spring urges the actuating member upwardly so as to return the carrier to its normal position.

Furthermore, in accordance with the present invention, the arrangement is such that when the holder is moved away from and towards the heating element, it is reversed end for end through an angle of 180°. To this end, there are provided on the frame element and the holder element a cooperating projection and guide-way, the latter having means, such as a switch plate, for directing the projection from one to the other side of the neutral or dead center point of the guide-way. In the present instance, the projection, designated by the numeral 30, depends from adjacent one end of the holder and works in a slot 31 in the guide or supporting plate 10. This slot, which extends generally parallel to the heating element, has a bowed or curved portion providing a seat, notch or apex 35 in its outer edge and a projection 36 in its rear edge. The notch 35 is so located that the projection 30 engages therein when the holder is substantially in the mid or central position shown in Fig. 2; actually the holder is slightly inclined towards that end of the toaster in which the carriers are pivoted.

In order to cause the projection, after it is engaged in the notch 35, to move in the same direction as that in which it has moved up to this notch, there is provided a switch plate 40 slidably mounted on the under side of the guide plate 10 and adjacent the rear edge of the slot 31 therein. For example, the switch plate may be secured in place for longitudinal sliding movement by means of rivets 41 extending through slots 42 in the switch plate. By preference, the switch plate is longitudinally bowed or curved so that, when it is attached to the guide plate by the rivets 41, it presses against the guide plate and thus accidental displacement of the switch plate is guarded against. The switch plate has a switch tongue or point 43 which is generally in the form of a V with its apex extending in the same direction of and disposed generally opposite to the apex or neutral point 35. The projection 36 is shaped similarly to the switch point 43 but is somewhat smaller, the construction preferably being such that when the switch plate is in one position one side of the point 43 is coincident with the corresponding side of the projection 36, and when the plate is in the opposite position, the opposite side of the switch point coincides with the other side of the projection 36. The switch plate has, at its opposite ends, lugs 44 and 45 forming abutments or shoulders which are adapted to be engaged by the projection 30 when the holder is brought to a normal position, thereby causing the switch plate to be moved longitudinally. It may be well to point out that, in the present illustrative disclosure, the projection 30 has a tendency, when leaving the notch 35, to move away from the axis of the carrier, that is, to the right referring to Fig. 2. For the purpose of preventing the projection from sliding out of the notch and along the front edge of the guide slot, the projection 36 is slightly offset to the right of the notch 35, and the right hand side of the notch has a pronounced shoulder 35'.

Figure 3:
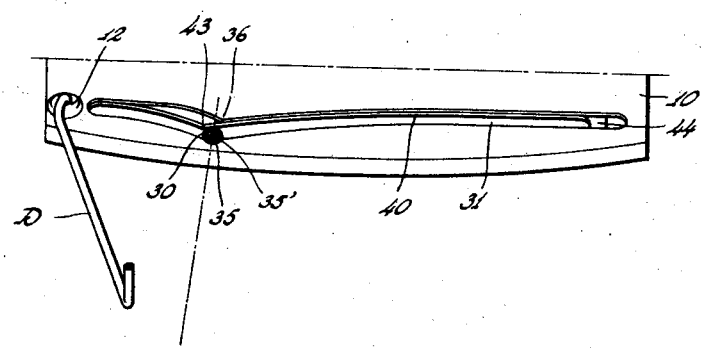
Fig. 3 is a detail view showing in perspective, one of the guiding slots and the associated switch plate.

The operation of the device is briefly as follows, particular reference being had to the foremost holder C. Assuming that the holder C is in toasting position with the projection 30 in the left hand end of the guide slot, when it is desired to reverse the holder, the foremost button 24 is depressed causing the carrier to swing downwardly. The projection 30 moves towards the right and into the notch 35 so that the holder assumes the position shown in Fig. 2. A slice of bread is now positioned in the holder and the button 24 is released, whereupon the actuating member 20 will be raised by the spring 29 causing the carrier D to swing in towards the heating element. When the carrier thus swings, the projection 30 will move from the notch 35 and will engage the right hand side of the switch point 43. The projection will move in the right hand portion of the slot 31 until the holder is parallel to the heating element. As the holder approaches its normal position, the projection 30 engages the right hand lug 44 causing the switch plate to be moved to the right, thus bringing the switch point to the right of the notch. When the actuating member is again depressed, the holder is reversed in the opposite direction, the projection 30 moving towards the left and into the notch 35. When the actuating member is released, the switch point will guide the projection into the left hand end portion of the slot. As the holder approaches its normal position, the projection will engage the left hand lug 45, thereby moving the switch plate to the position shown in Figs. 3 and 4.

As many changes could be made in the above construction and many apparently widely different embodiments of this invention could be made without departing from the scope thereof, it is intended that all matter contained in the above description or shown in the accompanying drawing shall be interpreted as illlustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a toaster, a frame having a heating element, a toast holder mounted for swinging movement about one axis and for reversing movement about an axis parallel to the first axis, a projection on said holder, a guide-way on said frame for guiding said projection, and a member carried by said frame for causing said projection to move past center in said guide-way.

2. In a toaster, a heating element, a toast holder mounted for swinging movement about one axis and for reversing movement about an axis parallel to the first axis, and means for reversing said holder when the same is swung about said first axis and comprising a projection on said holder, a guide-way on said frame for guiding said projection, and means movably mounted on said frame and controlled by said projection for causing said projection to move past center in said guide-way.

3. In a toaster, a frame having a heating element, a carrier pivoted for swinging movement, a toast holder mounted on said carrier for swinging movement about an axis parallel to the axis about which said carrier is swung, means for swinging said carrier, and means for reversing said holder when the carrier is swung and comprising a projection on said holder, a guide-way on said frame for guiding said projection, and means carried by the frame for causing said projection to move past center in said guide-way.

4. In a toaster, a combination of a frame, a heating element therein, a toast holder, a holder carrier comprising arms pivoted to said frame at points adjacent one end of said element and in a plane lying in front thereof and parallel thereto, and also pivoted to said holder adjacent its central portion, a projection on one end of said holder, a guide carried by said frame along which said projection moves, and a switch plate associated with said guide.

5. In a toaster, the combination of a frame, a heating element therein, a carrier pivoted adjacent one end of said element, a toast holder pivoted to said carrier adjacent its central portion, a projection on one end of said holder, a slot in the frame extending generally parallel to the plane of said element, and a switch plate movable longitudinally of said slot for directing said projection so that the holder will turn 180° when said carrier is moved out and then in towards said element.

6. In a toaster, the combination of a frame, a heating element therein, a carrier pivoted adjacent one end of said element, a toast holder pivoted to said carrier adjacent its central portion, a projection on one end of said holder, a slot in the frame extending generally parallel to the plane of said element, and a switch plate movable longitudinally of said slot for directing said projection so that the holder will turn 180° when said carrier is moved out and then in towards said element, said switch plate being longitudinally bowed and bearing against said frame.

7. In a toaster, a frame, a heating element therein, a carrier pivoted about a vertical axis adjacent one end of said element, a toast holder pivoted adjacent its central portion on said carrier, means for swinging said carrier, a slot in said frame, a projection on said holder engaging in said slot, a switch plate movably mounted on said frame and having adjacent its opposite ends lugs engaged by said projection for operating the switch plate.

8. In a toaster, a frame, a heating element therein, a carrier pivoted in said frame, a toast holder pivoted for reversing movement on said carrier about an axis parallel to the axis of the carrier, means for reversing said holder 180° when the carrier is swung out and then in towards the heating element, and means for swinging said carrier comprising an actuating member movable generally on a line parallel to the axis of said carrier, and means between said actuating member and carrier for converting the movement of the actuating member into oscillating movement of the carrier.

9. In a toaster, a frame, a heating element therein, a carrier pivoted in the frame, a toast holder reversibly carried by said carrier, means for reversing said holder when said carrier is swung, and means for swinging said carrier away and towards said element and comprising a spiral member fixed to and coincident with the axis of said carrier, and an actuating member movable longitudinally of said spiral.

10. In a toaster, a frame, a heating element therein, a carrier pivoted in the frame, a toast holder reversibly carried by said carrier, means for reversing said holder when said carrier is swung, and means for swinging said carrier away and towards said element and comprising a spiral member fixed to and coincident with the axis of said carrier, an actuating member having a slot receiving said spiral member, and means for guiding said actuating member.

11. In a toaster, a frame, a heating element therein, a carrier pivoted in the frame, a toast holder reversibly carried by said carrier, means for reversing said holder when said carrier is swung, and means for swinging said carrier away and towards said element and comprising a spiral member fixed to and coincident with the axis of said carrier, a lever pivoted at one side of said frame and extending through the other side of said frame, said lever having a slot receiving said spiral member, a pin in the frame, and a spring about said pin and engaging said lever.

12. In a toaster, a frame having a heating element, a carrier pivoted for swinging movement, a toast holder mounted on said carrier for swinging movement about an axis parallel to the axis about which said carrier is swung, a spiral member fixed to said carrier, a member movable longitudinally of said spiral for rotating the same, and means for reversing said holder when the carrier is swung and comprising a projection on said holder, a guide-way on said frame for guiding said projection, and means carried by the frame for causing said projection to move past center in said guide-way.

13. In a toaster, a frame having a heating element, a toast holder mounted for swinging and reversing movements about vertical axes, a guideway in which a part on said holder engages, and means on said frame for switching said part from one end to the other.

14. In a toaster, a frame having a heating element, a toast holder mounted for swinging and reversing movements about vertical axes, a narrow elongated slot in said frame having a notch and an opposed projection, and a movable switch plate having a point, said holder having a part engaging in said slot and controlling said plate.

15. In a toaster, a frame having a heating element, a toast holder mounted for swinging and reversing movements about parallel axes, said frame having a guiding slot, and a switch plate cooperating with said holder and slot, substantially as described.

ALONZO A. WARNER.